Patented May 21, 1929.

1,713,740

UNITED STATES PATENT OFFICE.

WILLIAM McC. CAMERON, OF NEW YORK, N. Y., AND GEORGE SCHNEIDER, OF MOUNTAIN LAKES, NEW JERSEY, ASSIGNORS TO CELANESE CORPORATION OF AMERICA, A CORPORATION OF DELAWARE.

MANUFACTURE OF COMPOSITIONS.

No Drawing. Application filed September 17, 1925. Serial No. 57,031.

This application is a continuation in part of our prior application, Serial No. 589,458, filed Sept. 20, 1922.

It is well known in the art of producing molded articles from thermoplastic materials and compositions that rosin, while extremely desirable from an economical point of view is unsatisfactory when employed for this purpose since it is almost entirely lacking in plasticity and tenacity when cold and when in a molten state is not capable of absorbing the quantity of inert filling which is necessary or desirable. We have discovered that by incorporating acetanilid with rosin as a solid solvent, a new and useful plastic composition is obtained. The rosin acquires the plasticity and tenacity which it previously lacked when cold and becomes a satisfactory thermoplastic material. It also acquires the durability of surface, sound reproducing property and an increased capacity for inert filling material that make it particularly applicable for use in the production of phonograph records and other molded articles.

The resulting product can be mixed in a ground, dry state or by melting, with filling materials, materials for effect, or dye or dyestuff materials, or other materials, compounds, chemicals or ingredients, in order to secure special qualities, rolled on heated rolls and pressed preferably under heat into molds or in or on other devices in the presence or absence of core pieces, for the manufacture of phonograph records and molded articles.

Example I.

In preparing the composition for use in producing phonograph records and molded articles requiring a similar strength and surface, we prefer to use ingredients in about the proportion of seventeen (17) parts rosin to three (3) parts of acetanilid. This material can them be adulterated with inert filling materials such as china clay, barytes, iron oxides, carbon, cotton flock, and the like. It may also be mixed with effect materials such as other gums, resins, shellacs, dyes, coloring matter, etc., in order to secure desired effects such as surface appearance, sound reproducing properties and durability.

Example II.

In preparing the composition for use in producing heavy moldings where the strength is obtained by thickness, or in producing a low priced article we prefer to use ingredients in about the proportion of fourteen (14) to fifteen (15) parts rosin with five (5) to six (6) parts acetanilid, as such a proportion has the economical advantage of absorbing more low priced inert filling materials than the proportion as given in Example I. The mixture can then, after being mixed with the inert filling material, be further adulterated with other gums, shellac, resins, colouring materials or other such materials to secure desired effects.

It will be readily seen that the greater the proportion of acetanilid used to the rosin, the softer or more nearly liquid is the resulting composition and good results may be obtained, depending upon the product or article to be finally produced, by varying the proportions from 10 parts rosin and 10 parts acetanilid to 19 parts rosin and one (1) part acetanilid.

The plastic composition obtained according to the above can also be used, in appropriate solution for the manufacture of varnishes, lacquers and enamels of all kinds, all of which are likewise, hereafter in the claiming clauses included in the term "composition of matter".

What we claim is:

1. A composition of matter comprising rosin and acetanilid in proportions varying from 10 parts rosin and 10 parts acetanilid to 19 parts rosin and 1 part acetanilid.

2. A composition of matter comprising about 17 parts rosin and about 3 parts acetanalid.

3. A composition of matter comprising rosin and acetanilid in proportions varying from 10 parts rosin and 10 parts acetanilid to 19 parts rosin and 1 part acetanilid, together with inert filling materials.

4. A composition of matter comprising about 17 parts rosin and about 3 parts acetanilid together with inert filling material.

5. Pressed and molded articles consisting of rosin and acetanilid in proportions varying from 10 parts rosin and 10 parts acetanilid to 19 parts rosin and 1 part acetanilid, together with inert filling materials and materials for effect.

6. Pressed and molded articles consisting of about 17 parts rosin and about 3 parts acetanilid together with inert filling materials and materials for effect.

In testimony whereof, we have hereunto subscribed our names.

W. McC. CAMERON.
GEO. SCHNEIDER.